(12) United States Patent
Deenadhayalan et al.

(10) Patent No.: US 7,853,823 B2
(45) Date of Patent: Dec. 14, 2010

(54) SYSTEM AND METHOD FOR RECONSTRUCTING LOST DATA IN A STORAGE SYSTEM

(75) Inventors: Veera W. Deenadhayalan, Fremont, CA (US); James Lee Hafner, San Jose, CA (US); Krishnakumar Rao Surugucchi, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/537,067

(22) Filed: Aug. 6, 2009

(65) Prior Publication Data

US 2009/0313499 A1 Dec. 17, 2009

Related U.S. Application Data

(63) Continuation of application No. 10/993,510, filed on Nov. 22, 2004, now abandoned.

(51) Int. Cl.
*G06F 11/00* (2006.01)

(52) U.S. Cl. .................. 714/6; 714/2; 714/770

(58) Field of Classification Search ............ 714/2, 714/5, 6, 742, 703, 764, 774, 54, 20, 770
See application file for complete search history.

(56) References Cited

U.S. PATENT DOCUMENTS

| | | | |
|---|---|---|---|
| 5,522,065 A | 5/1996 | Neufeld | |
| 5,579,475 A | 11/1996 | Blaum et al. | |
| 5,615,335 A | 3/1997 | Onffroy et al. | |
| 5,774,643 A * | 6/1998 | Lubbers et al. | 714/20 |
| 6,161,194 A | 12/2000 | Tanaka et al. | |
| 6,191,902 B1 | 2/2001 | Hashimura et al. | |
| 6,332,204 B1 | 12/2001 | Russell | |
| 6,560,718 B1 | 5/2003 | Wilson | |
| 6,625,748 B1 | 9/2003 | Tanaka et al. | |
| 6,985,995 B2 | 1/2006 | Holland et al. | |
| 7,043,679 B1 | 5/2006 | Keltcher et al. | |
| 7,058,762 B2 | 6/2006 | Patterson et al. | |
| 7,073,115 B2 | 7/2006 | English et al. | |
| 7,093,157 B2 * | 8/2006 | Hajji | 714/5 |
| 7,155,634 B1 | 12/2006 | La Graverand et al. | |
| 7,194,467 B2 | 3/2007 | Holland | |
| 7,581,156 B2 | 8/2009 | Manasse | |
| 2004/0260994 A1 | 12/2004 | Winograd et al. | |
| 2005/0283654 A1 | 12/2005 | Wood et al. | |
| 2006/0129873 A1 * | 6/2006 | Hafner | 714/5 |

* cited by examiner

*Primary Examiner*—Phung M Chung
(74) *Attorney, Agent, or Firm*—McGinn IP Law Group, PLLC

(57) ABSTRACT

A system (and method) for determining reconstruction formulas for partial strip reconstruction in a storage system in which a plurality of lost strips have been detected, includes using a combination of a direct reconstruction method and a sequential reconstruction method.

15 Claims, 10 Drawing Sheets

Strips →     0     1     2     ::     *N-1*

Row 0

Row 1

: :

Row *r-1*

FIGURE 3

| 500 | | | | | | |
|---|---|---|---|---|---|---|
| strip7 | Q0 | Q1 | Q2 | Q3 | Q4 | Q5 |
| strip6 | P0 | P1 | P2 | P3 | P4 | P5 |
| strip5 | 30 | 31 | 32 | 33 | 34 | 35 |
| strip4 | 24 | 25 | 26 | 27 | 28 | 29 |
| strip3 | 18 | 19 | 20 | 21 | 22 | 23 |
| strip2 | 12 | 13 | 14 | 15 | 16 | 17 |
| strip1 | 6 | 7 | 8 | 9 | 10 | 11 |
| strip0 | 0 | 1 | 2 | 3 | 4 | 5 |

FIG.5

| disk0 | disk1 | disk2 | disk3 | disk4 | disk5 | disk6 | disk7 |
|-------|-------|-------|-------|-------|-------|-------|-------|
| 0 | 6 | 12 | 18 | 24 | 30 | P0 | Q0 |
| 1 | 7 | 13 | 19 | 25 | 31 | P1 | Q1 |
| 2 | 8 | 14 | 20 | 26 | 32 | P2 | Q2 |
| 3 | 9 | 15 | 21 | 27 | 33 | P3 | Q3 |
| 4 | 10 | 16 | 22 | 28 | 34 | P4 | Q4 |
| 5 | 11 | 17 | 23 | 29 | 35 | P5 | Q5 |

FIG. 6

| strip0 | strip1 | strip2 | strip3 | strip4 | strip5 | strip6 | strip7 |
|--------|--------|--------|--------|--------|--------|--------|--------|
| 0 | 6 | 12 | 18 | 24 | 30 | P0 | Q0 |
| 1 | 7 | 13 | 19 | 25 | 31 | P1 | Q1 |
| 2 | 8 | 14 | 20 | 26 | 32 | P2 | Q2 |
| 3 | 9 | 15 | 21 | 27 | 33 | P3 | Q3 |
| 4 | 10 | 16 | 22 | 28 | 34 | P4 | Q4 |
| 5 | 11 | 17 | 23 | 29 | 35 | P5 | Q5 |

FIG.7

| Data Disks | Direct reconstruct method | Sequential reconstruct method | Exemplary combination of sequential reconstruct and direct reconstruct | Direct reconstruct method | Sequential reconstruct method vs Direct reconstruct method | Exemplary combination of sequential reconstruct and direct reconstruct vs Direct reconstruct method | Exemplary combination of sequential reconstruct and direct reconstruct vs Sequential reconstruct method | Down cases |
|---|---|---|---|---|---|---|---|---|
| 3 | 22 | 24 | 17 | 100% | 109% | 77% | 71% | 3 |
| 4 | 30 | 31 | 23 | 100% | 103% | 77% | 74% | 6 |
| 5 | 39 | 39 | 31 | 100% | 100% | 79% | 79% | 10 |
| 6 | 46 | 46 | 37 | 100% | 100% | 80% | 80% | 15 |
| 7 | 56 | 53 | 45 | 100% | 95% | 80% | 85% | 21 |
| 8 | 221 | 151 | 126 | 100% | 68% | 57% | 83% | 28 |
| 9 | 249 | 171 | 144 | 100% | 69% | 58% | 84% | 36 |
| 10 | 278 | 190 | 162 | 100% | 68% | 58% | 85% | 45 |
| 11 | 306 | 210 | 180 | 100% | 69% | 59% | 86% | 55 |
| 12 | 334 | 228 | 197 | 100% | 68% | 59% | 86% | 66 |
| 13 | 363 | 246 | 214 | 100% | 68% | 59% | 87% | 78 |
| 14 | 669 | 375 | 345 | 100% | 56% | 52% | 92% | 91 |

FIGURE 8

SYSTEM AND METHOD FOR RECONSTRUCTING LOST DATA IN A STORAGE SYSTEM

CROSS-REFERENCE TO RELATED APPLICATION

The present application is a Continuation Application of U.S. patent application Ser. No. 10/993,510, filed on Nov. 22, 2004, now abandoned.

The present application is related to U.S. patent application Ser. No. 10/978,389, filed on Nov. 2, 2004, to Hafner et al., entitled "SYSTEM AND METHOD FOR RECOVERY OF DATA FOR A LOST SECTOR IN A STORAGE SYSTEM", assigned to the present assignee and which is incorporated herein by reference, in its entirety.

BACKGROUND OF THE INVENTION

1. Field of the Invention

The present invention generally relates to a system and method for determining reconstruction formulas for reconstruction of lost data in a storage system, and more particularly, to a system and method for determining reconstruction formulas for partial strip reconstruction including a combination of a direct reconstruction method and a sequential reconstruction method.

2. Description of the Related Art

Generally, erasure codes (e.g., RAID schemes) are fundamental tools for providing data reliability in storage systems in the presence of unreliable disks. Conventionally, RAID4 and RAID5 systems protect against one disk loss or unaligned sector loss (not more than one sector per horizontal slice). Erasure codes that tolerate two disk failures have begun to be deployed. However, better fault-tolerance will be needed as more systems move to Advanced Technology Attachment (ATA) (e.g., non-Small Computer System Interface (non-SCSI)) drives.

Erasure codes such as RAID4 and RAID5 rely on a single level of redundancy (e.g., see P. Massiglia, The RAID Book, St Peter, Minn.: The RAID Advisory Board, Inc., 1997, which is incorporated herein by reference in its entirety) and so can protect against a single disk failure.

Other published algorithms employed by conventional systems and methods are implemented only in the "two disk" loss failure scenario. That is, each specific 2-fault tolerant erasure code generally is published with a specific algorithm for recovery in the "two disk lost" case. More general erasure codes that tolerate T failed disks are published with descriptions on how to recover the entire data on any T lost disks. Particularly, the Reed-Solomon scheme generally is employed, which uses linear algebra over finite fields to solve the "T disk lost" case. However, this is very complicated and typically requires either additional special purpose hardware or complicated and expensive software.

Conventional systems that tolerate 2 or more failed disks present reconstruction algorithms for recovering from such failures. Typically, these reconstruction algorithms provide means for reconstructing all of the lost data on both or all of the failed disks. The published literature generally does not provide algorithms for recovering partial disk data. The full reconstruction algorithms are best suited to the rebuild scenario where all the lost data is recovered and replaced on spare or replacement disks. However, there are scenarios where partial lost data needs to be recovered, but not all the lost data is required. Such a scenario occurs, for example, if 2 or more disks are lost and, prior to rebuild completion, the host issues a read request for a portion of the lost data. The present literature does not directly address this case, but assumes that it will be covered by the full reconstruction algorithms. Such reconstruction algorithms, particularly for the 2-fault tolerant erasure codes, but also in some higher fault tolerance erasure codes, generally involve a sequential or recursive algorithm. That is, they perform a sequence of steps, first recovering one element (sector, block, chunk) of lost data using available data and parity elements, then using that element of recovered data (and possibly other available lost data and parity elements) to recover another element of lost data, etc., until all elements of lost data are recovered. Such recursive algorithms are typically visualized by some geometric or patterned relationship between the data layout and the parity elements (e.g., parity may be computed along sloped lines through the data layout). An example is given below with reference to FIGS. 5, 6 and 7.

Because the typical reconstruction algorithms are sequential in nature and are designed to recover all the lost data, they may not be the most cost effective approaches to reconstruction of partial strips. For example, when the required partial disk data elements appear in the middle or at the end of the recurrence, these methods require reconstructing all the elements in the recurrence prior to the desired lost elements, and therefore consume extra resources reconstructing unnecessary data elements. Such resources include, but are not limited to CPU usage, disk IO costs, memory bandwidth, as well as XOR computations for those erasure codes based on XOR (these may be handled not by a general purpose CPU but by a special purpose XOR hardware engine).

On the other hand, the method provided in U.S. patent application Ser. No. 10/978,389, filed on Nov. 2, 2004, to Hafner et al., entitled "SYSTEM AND METHOD FOR RECOVERY OF DATA FOR A LOST SECTOR IN A STORAGE SYSTEM" provides an efficient means for reconstructing individual lost elements. The method of this patent application is referred to as a direct method in that it does not rely on any sequential data reconstruction, but provides an efficient and cost effective algorithm for reconstructing an element directly from a minimal number of data and parity elements. Such a method can also be utilized for the partial reconstruction problem by applying it to each of the lost data elements of the partial disk. However, such an application does not necessarily take into account that after some data elements are reconstructed, these newly reconstructed data elements may offset the direct cost of reconstructing other data elements nor does it take into account any "geometry" or patterns in the data/parity relations that are found in the design of particular erasure codes. Such patterns, which form the basis for the sequential reconstruct methods, may provide efficient means for reconstruction, not available to the more generic method of the referenced patent application.

SUMMARY OF THE INVENTION

In view of the foregoing, and other, exemplary problems, drawbacks, and disadvantages of the conventional systems, an exemplary feature of the present invention provides an illustrative, non-limiting method and system of partial strip reconstruction and/or determining reconstruction formulas for partial strip reconstruction in a storage system.

The method may include using a combination of a direct reconstruction method and a sequential reconstruction method to reconstruct the partial strip. In one exemplary aspect of the invention, the direct reconstruction method can determine at least one initialization point for the sequential reconstruction method. However, the ordinarily skilled artisan would recognize that the present invention is not limited to using the direct reconstruction method to provide an initialization point for the sequential reconstruction method.

The storage system may include at least one of a parity scheme and an XOR-based RAID scheme.

On the other hand, in an exemplary method the sequential reconstruction method can reconstruct a data element, from an input set of data elements to reconstruct, by collapsing the sequential reconstruction method to reduce cost. For example, the exemplary method can collapse the sequential reconstruction method by using implicit intermediate results to reconstruct the data element. Additionally or alternatively, the exemplary method can collapse the sequential reconstruction method by determining whether any unnecessary data elements exist in at least one strip of the plurality of lost strips that are not part of the partial strip, and combining at least a portion of steps in the sequential reconstruction method to eliminate reconstruction of the unnecessary data elements. Further, the exemplary method can collapse the sequential reconstruction method by avoiding unnecessary use of data elements that are not lost, avoiding duplicate use of data elements that are not lost, and/or avoiding multiple use of data elements that are not lost.

As mentioned above, the present invention can use a combination of the direct reconstruction method and the sequential reconstruction to reconstruct the partial strip.

According to the exemplary aspects of the present invention, from an input set of data elements to reconstruct, the exemplary method can identify at least one data element which has a lowest reconstruction cost using the direct reconstruction method, reconstruct the data element using the direct reconstruction method, and remove the data element from the input set of data elements to reconstruct.

On the other hand, from the input set of data elements to reconstruct, another exemplary method can determine if at least one data element from the input set is sequentially reconstructable by no more than (i.e., equal to or less than) a predetermined number of steps of the sequential method using available data and parity elements, can reconstruct the data element using the sequential reconstruction method, and can remove the data element from the input set of data elements to reconstruct.

If at least one data element from the input set is not sequentially reconstructed by no more than (i.e., equal to or less than) a predetermined number of steps using available data and parity elements, an exemplary aspect of the invention can identify at least one other data element, from the input set of data elements to reconstruct, which has a lowest reconstruction cost using the direct reconstruction method. Such lowest cost reconstruction may be determined from the values determined in the first application of the direct reconstruction method (e.g., from values computed in earlier steps of the present method) or the lowest cost reconstruction may be determined either by a reapplication of the direct reconstruction method after recovery of the last data element or by feeding the recovered data element information back into the direct method reverse incremental algorithm. This exemplary method can reconstruct the other data element (or data elements) using the direct reconstruction method, and remove the other data element (or data elements) from the input set of data elements to be reconstructed.

Another exemplary aspect of the invention is directed to a system for partial strip reconstruction in a storage system. The system may include a storage unit of the storage system including an input set of data elements to reconstruct, and means for reconstructing a data element from the input set of data elements to reconstruct using a combination of a direct reconstruction method and a sequential reconstruction method. The means for reconstructing may use the direct reconstruction method to determine at least one initialization point for the sequential reconstruction method. The storage system also may include at least one of a parity scheme and an XOR based RAID scheme.

In another exemplary system, the means for reconstructing reconstructs a data element, from an input set of data elements to reconstruct, by collapsing the sequential reconstruction method to reduce cost. The exemplary means for reconstructing can collapse the sequential reconstruction method by using implicit intermediate results to reconstruct the data element, by determining whether any unnecessary data elements exist in at least one strip of the plurality of lost strips that are not part of the partial strip, and combining at least a portion of steps in the sequential reconstruction method to eliminate reconstruction of the unnecessary data elements, by avoiding unnecessary use of data elements that are not lost, by avoiding duplicate use of data elements that are not lost, and/or by avoiding multiple use of data elements that are not lost.

Another exemplary aspect of the invention is directed to a system of determining reconstruction formulas for partial strip reconstruction in a storage system. The system may include a storage unit of the storage system including an input set of data elements to reconstruct, and a reconstructing unit that reconstructs a data element from the input set of data elements to reconstruct using a combination of a direct reconstruction method and a sequential reconstruction method.

Another exemplary aspect of the invention is directed to a method for determining reconstruction formulas for partial strip reconstruction in a storage system in which the method includes determining a combination of a direct reconstruction method and a sequential reconstruction method to reconstruct the partial strip. The method may include reconstructing the partial strip based on the combination of the direct reconstruction method and the sequential reconstruction method.

Another exemplary aspect of the invention is directed to a signal-bearing medium serving as a storage device, including, for example, a diskette tangibly embodying a program of machine-readable instructions executable by a digital processing apparatus to perform a method for determining reconstruction formulas for partial strip reconstruction in a storage system, the method including a combination of a direct reconstruction method and a sequential reconstruction method.

On the other hand, another exemplary aspect of the invention is directed to a method of deploying computing infrastructure in which computer-readable code is integrated into a computing system, and combines with the computing system to perform a method for determining reconstruction formulas for partial strip reconstruction in a storage system, the method including a combination of a direct reconstruction method and a sequential reconstruction method.

With the unique and unobvious features of the exemplary aspects of the present invention, a novel and unobvious system and method for determining reconstruction formulas for partial strip reconstruction in a storage system including a combination of a direct reconstruction method and a sequential reconstruction method is provided that solves the problems of the conventional systems and methods.

More particularly, the exemplary aspects of the system and method according to the present invention are capable of being applied in many (e.g., all) situations, and can outperform the related art methods in many (e.g., all) instances (e.g., as described below with reference to FIG. 9). Further, the exemplary aspects of the present invention do not reconstruct any data elements that are not needed, thereby reducing the cost of reconstructing the data elements. As mentioned above, such costs can affect the performance of a storage system, since the costs may consume limited resources such as CPU, memory bandwidth, disk IO capacity, or XOR engine resources.

Such a structure and method have not been addressed or even contemplated by the conventional systems and methods.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 3 illustrates an exemplary form 300 of two-dimensional RAID erasure codes according to an illustrative aspect of the invention;

FIGS. 5 and 6 illustrate exemplary techniques and schemes 500 according to an illustrative aspect of the invention;

FIG. 7 illustrates yet another exemplary method 700 according to yet another illustrative aspect of the invention;

FIG. 8 illustrates a table 800 comparing an exemplary method according to an illustrative aspect of the invention with related art methods.

DETAILED DESCRIPTION OF EXEMPLARY EMBODIMENTS OF THE INVENTION

Figure 1:
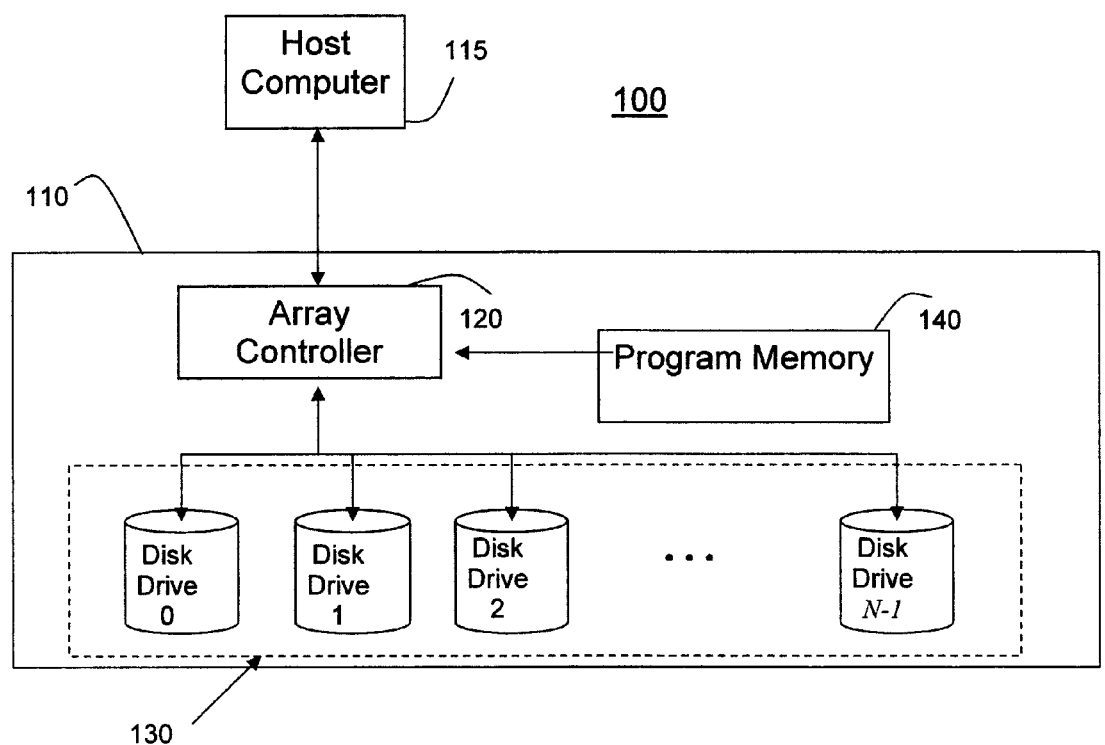
FIG. 1 illustrates an exemplary storage system 100 according to an illustrative aspect of the invention.

Referring now to the drawings, and more particularly to FIGS. 1-9, there are shown exemplary embodiments of the method and systems according to the present invention.

With reference to the Figures, FIG. 1 illustrates an exemplary environment in which a system and associated method (collectively referred to as "the present system" 110) can be implemented. A host computer 115 is connected to an array controller 120 of system 110. The host computer 115 stores data on the array controller 120. The array controller uses a program or logic extracted from the program memory 140 to determine redundancy values (hereinafter referred to as parity values) for the data according to the erasure code of the system 110, and stores the data and parity values in the disk drives 130. If sector losses are detected by the array controller 120 when accessing one or more of the disk drives 130, then the array controller calls on additional program instructions from the program memory 140 that implements the present system to determine recovery formulas using a combination of direct methods and sequential methods.

Figure 2:
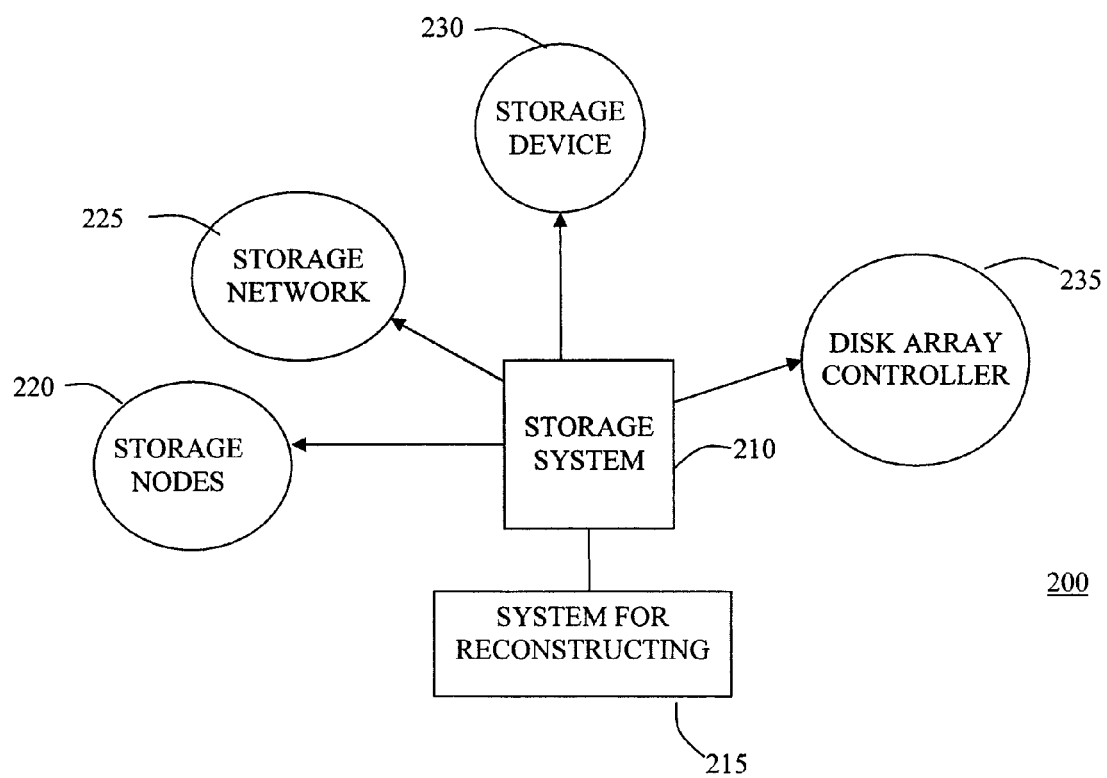
FIGS. 2 and 2A illustrate an exemplary system 200 according to an illustrative aspect of the invention.

As illustrated in a system 200 of FIG. 2, the storage system according to the claimed invention can exemplarily include one of (or a combination of) a storage device (e.g., 230), a plurality of storage nodes (e.g., 220), a storage network (e.g., 225), and/or a disk array (e.g., see disk array controller 235).

Moreover, the storage system according to an exemplary aspect of the invention can include storage devices such as a redundant array of inexpensive disks (RAID) disk array. A disk array controller 235 may include an erasure code that tolerates one or more disk failures.

Figure 2A:
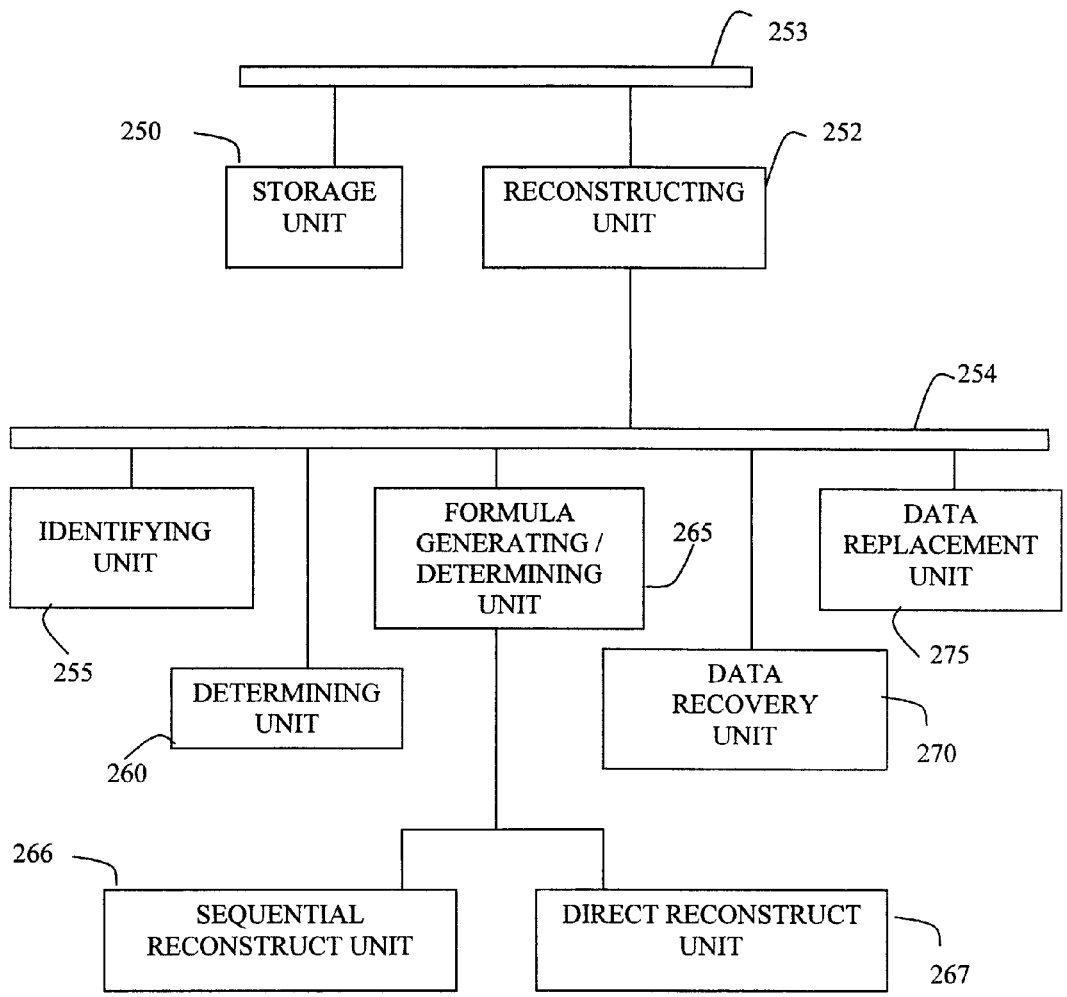

As illustrated in the exemplary system 200 of FIGS. 2 and 2A, a system of determining reconstruction formulas for partial strip reconstruction in a storage system (e.g., 215) can include a storage unit (e.g., 250) and means for reconstructing (e.g., reconstructing unit 252) a data element from the input set of data elements (e.g., 251) based on a combination of a direct reconstruction method (e.g., direct reconstruction unit 267) and a sequential reconstruct method (e.g., sequential reconstruct unit 266).

Particularly, in one exemplary aspect of the present invention, an identifying unit (e.g., 255) identifies at least one data element which has a lowest reconstruction cost using the direct reconstruction method. A determining unit (e.g., 260) determines, for example, whether at least one data element from the input set can be sequentially reconstructed by equal to or less than a predetermined number of steps of the sequential algorithm using available data and parity elements. A formula generating/determining unit (e.g., 265) generates/determines, for example, a formula for a sequential reconstruct method and/or a direct reconstruct method. A data recovery unit (e.g., 270) recovers, for example, the recoverable data of the data element based on the recovery formula. A data replacing unit (e.g., 275) replaces, for example, the recovered data, which is obtained by the recovery unit 270, within the storage system of later use.

The storage unit (e.g., 250) and reconstructing unit (e.g., 252) may be coupled together by a bus 253 or the like. On the other hand, the identifying unit (e.g., 255), determining unit (e.g., 260), formula generating/determining unit (e.g., 265), data recovery unit (e.g., 270), and replacing unit (e.g., 275) may be coupled together by a bus 254 or the like. One of ordinary skill in the art would recognize that these units may be coupled together by any connector unit, such as a bus, a network (e.g., worldwide or local area), or the like.

The storage system according to the present invention exemplarily may include at least one of a storage device (e.g., 230), a plurality of storage nodes (e.g., 220), a storage network (e.g., 225), and/or the disk array controller (e.g., 235), etc.

Erasure codes generally are used in RAID (Redundant Array of Independent Disks) schemes to provide redundancy to user data. Depending on the Hamming distance, the erasure code may be able to reconstruct one or more erased data elements (e.g., data symbols), by using the remaining available data and checksum elements (e.g., symbols). Some erasure codes lay out the Erasure Code Set in a two-dimensional format, using rows and columns of elements. Based on their layout, such erasure codes are categorized as two-dimensional erasure codes.

Figure 3:
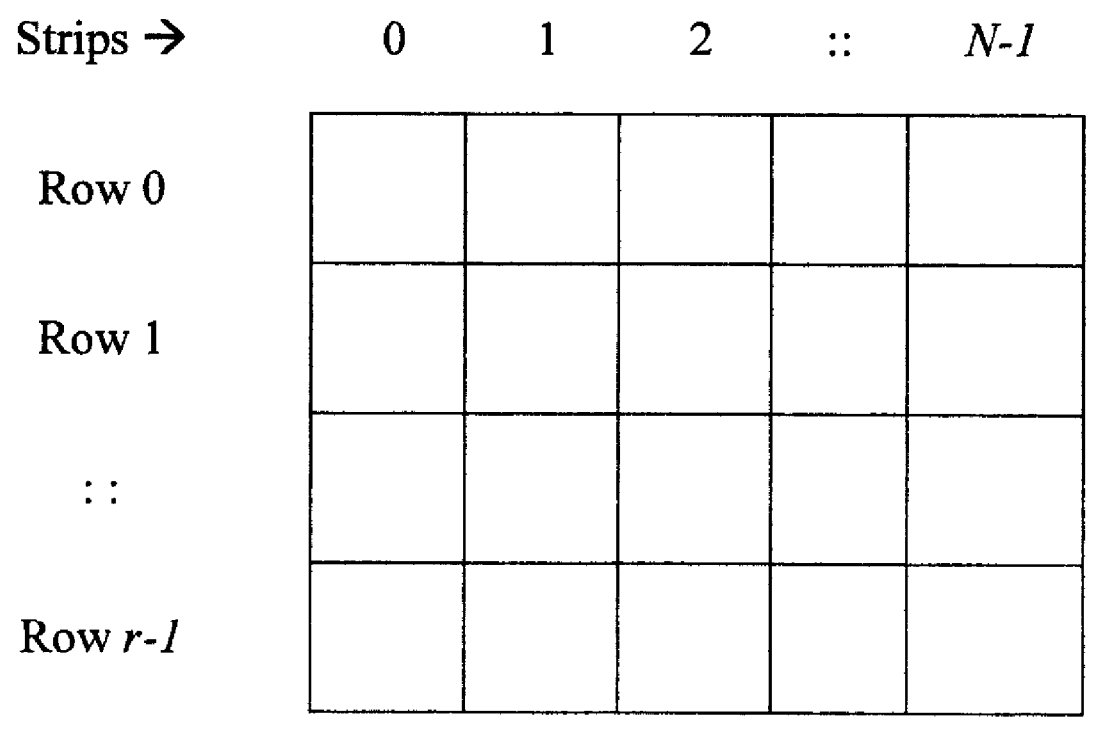

For example, FIG. 3 illustrates the form of two-dimensional erasure codes (e.g., RAID erasure codes). Each of the cells in the two-dimensional layout illustrated in FIG. 3 holds either a data element or a checksum element. Each column is also referred to as a strip. Each strip is divided into many rows (i.e., many elements). Each strip of a given erasure code set usually resides on independent disks. Depending on the erasure code layout, the location of data elements and checksum elements will vary. Also, the method of computing the checksum may vary depending on the specific erasure code.

The present invention exemplarily describes a novel combination of two exemplary methods to reconstruct lost data elements in the case of two-dimensional erasure codes.

Figure 4:
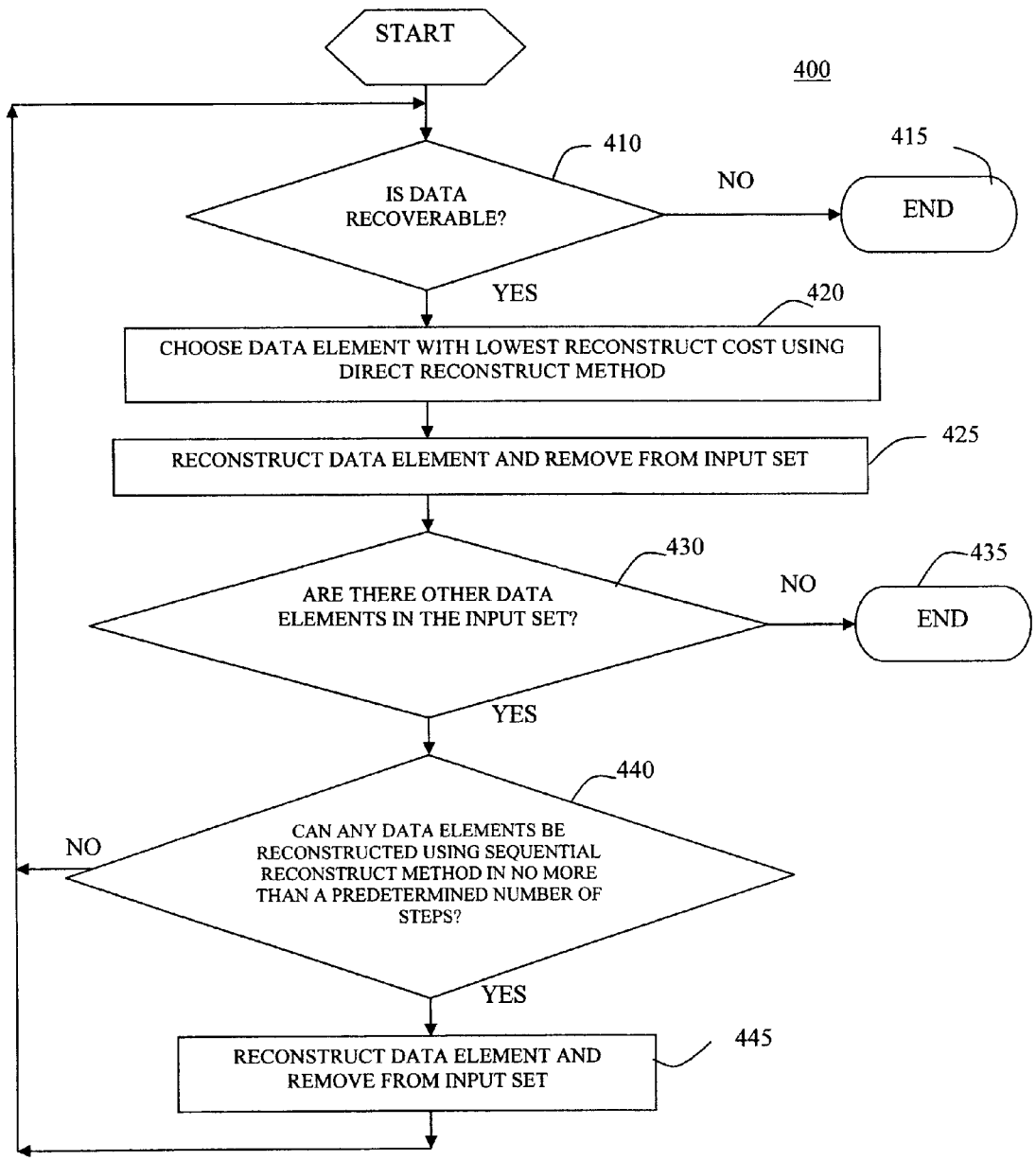
FIG. 4 illustrates exemplary method 400 according to another illustrative aspect of the invention.

With reference to FIG. 4, first, a sequential (e.g., recursive) reconstruct can be used, which involves a sequence of steps to reconstruct a missing data element. For instance, to reconstruct a data element n, it may be necessary to sequentially reconstruct data element j, then data element k, then data element l, etc., to allow reconstruction of data element n.

Second, a direct reconstruct can be used, which involves an algebraic inverse matrix to reconstruct a missing piece of data. This method does not involve a sequence of reconstruction steps as in the sequential reconstruct process. Every data element in all the missing strips can be independently and directly reconstructed using the values in the available data and parity elements.

Thus, for purposes of the present application, "sequential reconstruction" represents/means reconstructing lost data elements by following a sequence of steps wherein the first step involves reconstructing a single lost data element from known data and parity elements, and each successive step consists of reconstructing some other lost data element using the data element reconstructed in the previous step, known data and parity elements, and perhaps other data elements reconstructed in earlier steps. On the other hand, "direct reconstruction" represents/means reconstructing a lost data element only from known data and parity elements in one step. The first step of the sequential method can be viewed as an application of a direct reconstruction method. However, the direct reconstruction method can be applied to any lost data element (not just the first element in the sequence), without having to reconstruct intermediate data elements as in the sequential method.

Any one of these two exemplary methods may be used to reconstruct an erased data element or a collection of data elements as in a partial strip. For example, a sequential reconstruct may use the least number of computations to reconstruct an entire sequence, while a direct reconstruct may use the least number of computations to reconstruct a single element. The computation cost directly affects the memory bandwidth, IO bandwidth, etc.

To reconstruct a partial strip, which is more than one element, but less than the entire strip, it may be possible to use either a sequential reconstruct method or a direct reconstruct method. However, both of these related art schemes are inefficient to reconstruct a partial strip.

On the other hand, by using the exemplary method according to the present invention, a combination of a direct reconstruct method and a sequential reconstruct method (e.g., a hybrid of a direct reconstruct method and a sequential reconstruct method), a partial strip can be reconstructed with a cost that is less than or equal to the sequential reconstruct method or the direct reconstruct method alone.

The exemplary aspects of the present invention can improve using a fewer number of computations to reconstruct an erased data element. Thus, the present invention directly impacts and improves the performance of the storage device. Therefore, the reconstruction method according to the exemplary aspects of the present invention can provide better performance when compared to using either the sequential reconstruct method or the direct reconstruct method alone.

With reference to FIG. 4, an exemplary method according to the present invention is described.

First, the exemplary method (e.g., via unit 215) determines if there are data elements in the input set to be reconstructed (e.g., step 410, such a determination may be made by examining the state of the stripe and determining if the input set is fully contained within a number of strips which is less than or equal to the fault tolerance of the erasure code, or it may be made by applying the method of U.S. patent application Ser. No. 10/978,389, filed on Nov. 2, 2004, to Hafner et al., entitled "SYSTEM AND METHOD FOR RECOVERY OF DATA FOR A LOST SECTOR IN A STORAGE SYSTEM"). If so, the exemplary method (e.g., via unit 255) chooses a data element, from the input set of data elements to reconstruct, that has the lowest reconstruction cost using a direct reconstruct method (e.g., step 420). For purposes of the present invention, one way to determine which element has the lowest cost would be to apply the matrix method of the afore referenced patent application and determine which of the required lost data elements has the lowest reconstruction cost (i.e., has the fewest number of ones in the matrix columns associated to those elements). Other ways or criteria to use may include logically following the sequential algorithm to see which of the lost elements appears first in the sequence. This data element generally will (e.g., always will) also have the lowest cost for a sequential reconstruct method, which generally will (e.g., always will) be equal to or greater than the direct cost method.

The ordinarily skilled artisan would understand that the selection need not be made based on the lowest cost as measured by the exemplary aspect above, but instead, may be made by any other criterion that is more suitable to a particular implementation. In other words, while the measure of lowest cost may be (e.g., in a preferred aspect of the invention) the number of XOR computations, other measures of cost also can be applied (e.g., other metrics associated with the cost besides XOR).

Second, the exemplary method (e.g., via unit 267) removes the data element from the input set and uses the direct reconstruct method to reconstruct the data element (e.g., step 425).

Third, the exemplary method (e.g., via unit 255) determines if there are any other data elements in the input set to be reconstructed (e.g., step 430). If the input set is empty (i.e., there are no more data elements in the input set to be reconstructed), then the exemplary method is complete (e.g., step 435). On the other hand, if there are more data elements in the input set to be reconstructed, the method proceeds to the next step (e.g., step 440).

Fourth, the exemplary invention determines (e.g., via unit 265) if any of the data elements in the input set can be constructed using a sequential reconstruct method in at most a predetermined number of steps (i.e., in a predetermined number of steps or less) using the last reconstructed data element and any other available data and parity elements (e.g., step 440). Such a determination may be based on logically following the sequential algorithm to determine if, from the step at which the last reconstructed data element appears, it is possible to arrive at any other input data element at any of the next steps within a predetermined number of steps of the sequential algorithm.

If so, the exemplary method removes the data element from the input set and uses a sequential reconstruct method to reconstruct that data element (e.g., step 445).

If not, the exemplary method returns to the first step (e.g., step 410) and, if there are data elements remaining in the input set of data elements to be reconstructed, determines which of the remaining data elements has the lowest reconstruction cost using a direct reconstruct method (e.g., step 420). Once again, as explained above, determining the lowest reconstruction cost may be performed by comparing the costs of reconstruction derived at by the direct matrix method (with or without use of the reverse incremental algorithm), or by logically following the sequential method to determine which remaining elements appear at the earliest step in the sequence, or by other means that may be determined by specific or general aspects of the specific erasure code of the system. As with the second step above, the exemplary method removes that data element from the input set and uses the direct reconstruct method to reconstruct the data element (e.g., step 425).

The exemplary method continues this process until all of the data elements to be reconstructed are reconstructed using either the direct reconstruction method or the sequential reconstruction method, wherever applicable.

The value of the predetermined number of steps of the sequential method used in step 440 may be set by a function of any or all of the following items, or by any other means: the parameters and specific parity formulas of the erasure code (including but not limited to the number of rows, the number of strips, the parity computation patterns, the fault tolerance level, etc.), the specific logical strip numbers (including but not limited to the difference of these strip numbers), the number of strips that are lost, and the size or number of elements of the partial strip that need reconstructing.

The ordinarily skilled artisan will recognize that it would not be necessary, according to the present invention, to begin the process of reconstructing data elements using the direct reconstruction method (e.g., step 420). Instead, either the sequential reconstruct method (e.g., step 440) or the direct reconstruct method (e.g., step 420) may be used to initiate the process of reconstructing the data elements.

Moreover, it would not be necessary to alternate between the direct reconstruct method (e.g., step 420) and the sequential reconstruct method (e.g., step 440). That is, either the direct reconstruct method or the sequential reconstruct method may be used repeatedly or in any order to reconstruct the data elements to be reconstructed, depending on the best (e.g., lowest cost) manner of reconstructing the data elements for the given arrangement.

An advantage of the present invention is that it is applicable, and works well, for all cases of reconstructing data elements, such as a full strip read, a single data element read, a partial strip read, etc.

For example, to reconstruct a single data element, the present invention can reconstruct the single data element using only the direct reconstruction method. On the other hand, to reconstruct a full strip or rebuild two or more strips, the present invention can reconstruct the full strip, two strips, etc., of data elements by using only the sequential reconstruction method.

Moreover, the present invention also can reconstruct a partial strip, which is more than one element but less than the entire strip. The problem of reconstructing any one of or all of a single data element, full strip or multiple strips, and/or more than one element but less than an entire strip of elements, etc., has not been addressed by the conventional or related art methods.

FIGS. 5 and 6 illustrate another exemplary method 500 according to the present invention.

With reference to FIG. 5, the example is an instance of the EvenOdd code (e.g., see M. Blaum, et al, "EVENODD: an efficient scheme for tolerating double disk failures in RAID architectures", IEEE Transactions on Computers, vol. 44, pp. 192-202, 1995, which is incorporated herein by reference in its entirety) and which includes eight (8) strips (columns) and six (6) rows. P-parity is indicated horizontally, while Q-parity is indicated diagonally. The XOR of the main diagonal (e.g., elements 11, 16, 21, 26, and 31) is included in every Q-parity.

For purposes of this application, P-parity is defined as the XOR of the data elements from strips 0 through strip 5. That is, each P-parity element in the P-parity strip is computed as the XOR of the data elements from its row. Mathematically, "P0"="0"+"6"+"12"+"18"+"24"+"30", "P1"="1"+"7"+"13"+"19"+"25"+"31", through "P5"="5"+"11"+"17"+"23"+"29"+"35". Q-parity is defined as XORs of elements along diagonals of slope 1 through the data element layout, with the special main diagonal XOR included in each Q-parity. Mathematically, the main diagonal XOR is labeled "S" and is computed by "S"="11"+"16"+"21"+"26"+"31" and the Q-parity elements are computed as "Q0"="S"+"0"+"17"+"22"+"27"+"32", "Q1"="S"+"1"+"6"+"23"+"28"+"33", through "Q5"="S"+"5"+"10"+"15"+"20"+"25"+"30".

For the EvenOdd code, the main diagonal term S is included in the XOR formulas for the Q-parity elements as indicated above. For this example and in FIGS. 8 and 9, it is assumed as a preliminary step prior to any application of the reconstruction methods, that S has been pre-computed and stored for example in memory and that each of the Q-parity element values has the S term removed and the resulting modified Q-parity elements are also stored in memory. In other words, it is assumed that each of the XOR sums of the separate diagonals of data elements is readily available to the reconstruction methods. This is done in these examples because it is a reasonable implementation of the EvenOdd code and because this S value is a special artifact of this code; consequently, the assumption of this pre-computation is both reasonable and more natural for comparison.

For purposes of this example, strips 1 and 2 have been lost. A read request has been received for substrip consisting of elements [8, 9, 10]. We measure the cost of reconstruction as the total number of terms in the XOR formulas that are used to reconstruct a particular element; this includes the number of input terms as well as the output term. For example, the cost of computing the "Q0" parity given above is 13, since there are 5 inputs and one output to computing "S" (that is, 6 for "S") and 6 inputs and one output (an additional 7) to complete the computation of "Q0".

The sequential reconstruct method would reconstruct element 17 using Q0 (diagonal), then element 11 using P5 (horizontal), then element 16 using S, etc., until element 8 was reached using P2 (horizontal). The sequential reconstruct method would reconstruct elements 17, 11, 16, 15, and 14, even though these elements are not necessarily needed to reconstruct elements 8, 9 and 10. The total cost of this operation is 53 XOR terms.

On the other hand, the direct reconstruct method (as described, for example, in the related U.S. patent application Ser. No. 10/978,389, filed on Nov. 2, 2004, to Hafner et al., entitled "SYSTEM AND METHOD FOR RECOVERY OF DATA FOR A LOST SECTOR IN A STORAGE SYSTEM", which is incorporated herein by reference, in its entirety) provides separate formulas for elements 8, 9, and 10 and ignores any "geometry" or pattern of the elements. The direct cost for these elements is 20, 22, and 18, respectively, so the total cost is 60.

In comparison, with reference to FIG. 6, the hybrid of, or combination of, the direct reconstruct method and the sequential reconstruct method according to the present invention, reconstructs element 10 via a direct reconstruct formula. In this case, element 10 has the lowest cost of the three elements needed. That is, it has the lowest cost of 18 since the direct reconstruction formulas for elements 8, 9, and 10 have costs 20, 22, and 18, respectively.

Next, using element 10, the exemplary method follows the diagonal up to element 15, then horizontally back to element 9. Element 9 is then reconstructed using Q5 and P3.

That is, element 15 is implicitly reconstructed. In other words, the present invention can avoid actually computing element 15 because if one combines the formulas to get to element 15 (e.g., diagonal) and to get back to the original strip (horizontal) to element 9, then element 15 (i.e., the element in the next strip) falls out of the equation. Thus, element 15 can be implicitly or logically reconstructed without actually determining element 15 (and incurring the attendant processing cost). This process also can be referred to as "collapsing", which avoids having to actually determine the element (e.g., element 15) in the middle of the sequence (e.g., elements 10, 15, 9). "Collapsing" is advantageous in that is reduces the number of XOR computations required (intermediate results are not computed directly) and it reduces the memory bandwidth requirements since intermediate results may not need to be stored and retrieved from the memory subsystem. For example, computing element 15 first requires a cost of 7, then computing element 9 from 15 requires an additional 7, which results in a total sequential cost of 14. However, by collapsing the formulas, the cost of computing element 9 from element 10 with element 15 implicit is only 12. This saves both in computation cost as well as memory bandwidth because element 15 need not be stored in or retrieved from the memory subsystem.

Element 9 can be used to follow up to element 14, then horizontally back to element 8. Thus, element 8 can be reconstructed using Q4 and P2. Again, element 14 is implicitly reconstructed. The cost of this collapsed computation is 11. As a result, the total cost of the exemplary combined method for reconstructing the partial strip [8, 9, 10] is only 41; this should be compared to a cost of 59 for the sequential method and 60 for the direct method.

In another example, with reference to FIG. 7, erasure strips 1 and 3 are lost. As with the example illustrated in FIGS. 5 and 6, the read request is for substrip [8, 9, 10]. The sequential reconstruct method alone results in a cost totaling 46 and the direct reconstruct method alone results in the cost 45 (direct costs of 19, 15, and 11, for elements 8, 9, and 10, respectively).

In comparison, with the combination of the sequential reconstruct method and direct reconstruct method according to an exemplary aspect of the present invention, the direct reconstruct provides element 10, which has the lowest cost (e.g., the direct method determines that the reconstruct cost for elements 8, 9, and 10 are 19, 15, and 11 respectively) of the elements to be reconstructed. The exemplary method proceeds from element 10 through implicit element 20 to element 8 (i.e., via Q5 and P2), at an additional cost of 12.

The exemplary method then reaches the end of this short sequence by determining that no other element in [8, 9, 10] can be reconstructed in two steps of the sequential method, and returns to the beginning step of the method. That is, the exemplary method uses a direct reconstruct to determine element 9, (at a cost of 15) which is the next lowest cost of the elements to be reconstructed, and proceeds from element 9, if possible. When all of the elements to be reconstructed are reconstructed and removed from the input set, the method is deemed complete, as it is in this example. This exemplary method has a total cost of 38, which is better than the costs of 46 for the sequential method alone and costs of 45 for the direct method alone.

Figure 9:
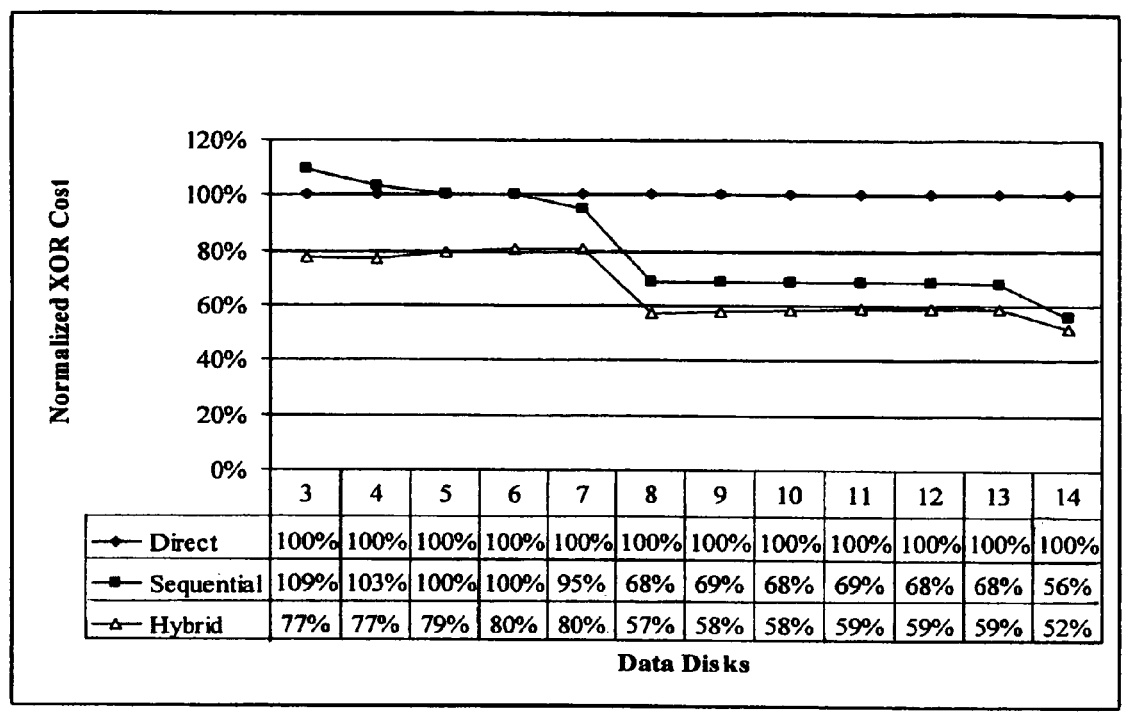
FIG. 9 illustrates a graph 900 comparing an exemplary method according to an illustrative aspect of the invention with related art methods.

FIGS. 8 and 9 illustrate a comparison of three possible methods for the EvenOdd erasure code, with varying array widths. The data depicted in FIGS. 8 and 9 is taken from an exemplary Even-Odd code averaged over all half-strip reconstructs with the precomputation step described above. For the purposes of these computations, the sequential method is applied only if the data element can be reached in the sequential method by no more than four steps (at most two diagonal and two horizontal steps). For number of data disks 7 or less, the prime defining the EvenOdd code is taken to be 7, for number of data disks between 8 and 13 inclusive, the prime is taken to be 13 and for number of data disks equal to 14, the prime is taken to be 17. FIGS. 8 and 9 clearly show that the present invention (e.g., the hybrid or combination of the direct reconstruct method and the sequential reconstruct method) not only can be applied in many (e.g., all) situations, but that the exemplary aspect of the present invention also outperforms the related art methods in many (e.g., all) instances.

As shown in FIGS. 8 and 9, in some cases, for example, the exemplary method of the present invention may perform approximately 10-30% better than using a sequential reconstruct method alone, or 25-50% better than using a direct reconstruct method alone.

In FIG. 9, which depicts a partial strip reconstruction cost comparison, the size of the disk array is indicated along the x-axis, while the XOR costs are indicated along the y-axis (e.g., normalized to sequential).

As mentioned above, in most cases (e.g., all cases), the hybrid (i.e., combination) of the direct reconstruct method and the sequential reconstruct method according to the exemplary aspect of the present invention performs better than either the direct reconstruct method or the sequential reconstruct method alone.

The examples given above show how the invention is applicable to a specific erasure code (the EvenOdd code) that can tolerate two disk (or strip) failures. However, there are many other erasure codes in the current art that can tolerate 2 and in some cases more disk losses and to which the present invention is applicable. Most 2-fault tolerant codes are built from similar geometric or other patterns within the data layout. Such patterns provide the basis for a sequential reconstruction algorithm that is specific to each code. Many higher fault tolerant codes are also built from such geometric or pattern constructions. In some cases, there is a clear and simple sequential algorithm that can be derived from the patterns. In other cases, the sequential algorithms exist but are typically more complicated than for the 2-fault tolerant codes. In many of these cases, however, the method of the present invention can be used to improve the efficiency of partial strip reconstruction by a combination of the direct and sequential methods. The present invention provides a means to jump into the middle of a sequential algorithm in all cases, thus avoiding unnecessary early sequence computations and reconstructions. For T fault tolerant erasure codes, the predetermined number of steps of step 440 of FIG. 4 would typically be set to a value larger than that used for the case T=2 (in our example, when T=2, we use the value 4). However, other values may be applied and are within the spirit and scope of the invention.

While the invention has been described in terms of several preferred embodiments, those skilled in the art will recognize that the invention can be practiced with modification within the spirit and scope of the appended claims.

Further, it is noted that, the inventors' intent is to encompass equivalents of all claim elements, even if amended later during prosecution.

What is claimed is:

1. A method for partial strip reconstruction in a storage system in which a plurality of lost strips have been detected, said method comprising:
    using a combination of a direct reconstruction method and a sequential reconstruction method to reconstruct said partial strip, as executed by a processor of a computer,
    wherein said sequential reconstruction method reconstructs a data element, from an input set of data elements to reconstruct, by collapsing said sequential reconstruction method to reduce cost,
    wherein said collapsing said sequential reconstruction method comprises at least one of:

using implicit intermediate results to reconstruct said data element;

determining whether any unnecessary data elements exist in at least one strip of the plurality of lost strips that are not part of said partial strip, and combining at least a portion of steps in said sequential reconstruction method to eliminate reconstruction of said unnecessary data elements;

avoiding unnecessary use of data elements that are not lost;

avoiding duplicate use of data elements that are not lost; and avoiding multiple use of data elements that are not lost.

2. The method according to claim 1, wherein said direct reconstruction method determines at least one initialization point for said sequential reconstruction method.

3. The method according to claim 1, wherein said storage system includes at least one of a parity scheme and an XOR-based RAID scheme.

4. The method according to claim 1, wherein said direct reconstruction method determines a most cost effective starting point for said sequential reconstruction method.

5. The method according to claim 1, further comprising:
from an input set of data elements to reconstruct, identifying at least one data element which has a lowest reconstruction cost using said direct reconstruction method;
reconstructing said data element using said direct reconstruction method; and
removing said data element from the input set of data elements to reconstruct.

6. The method according to claim 5, further comprising:
from said input set of data elements to reconstruct, determining if at least one data element from the input set is sequentially reconstructable by no more than a predetermined number of steps using available data and parity elements;
reconstructing said data element using said sequential reconstruction method; and
removing said data element from the input set of data elements to reconstruct.

7. The method according to claim 6, wherein, if at least one data element from the input set is not sequentially reconstructable by no more than a predetermined number of steps using available data and parity elements, identifying at least one other data element, from said input set of data elements to reconstruct, which has a lowest reconstruction cost using said direct reconstruction method;
reconstructing said at least one other data element using said direct reconstruction method; and
removing said at least one other data element from the input set of data elements to reconstruct.

8. The method according to claim 5, further comprising:
collapsing said sequential reconstruction method to reduce cost.

9. The method according to claim 1, further comprising:
from an input set of data elements to reconstruct, determining if at least one data element from the input set is sequentially reconstructable by no more than a predetermined number of steps using available data and parity elements;
reconstructing said data element using said sequential reconstruction method; and
removing said data element from the input set of data elements to reconstruct.

10. The method according to claim 9, wherein, if at least one data element from the input set is not sequentially reconstructable by no more than a predetermined number of steps using available data and parity elements, identifying at least one other data element, from said input set of data elements to reconstruct, which has a lowest reconstruction cost using said direct reconstruction method;
reconstructing said at least one other data element using said direct reconstruction method; and
removing said at least one other data element from the input set of data elements to reconstruct.

11. A system for partial strip reconstruction in a storage system, said system comprising:
a storage unit of said storage system including an input set of data elements to reconstruct; and
means for reconstructing a data element from said input set of data elements to reconstruct based on a combination of a direct reconstruction method and a sequential reconstruction method,
wherein said means for reconstructing reconstructs a data element, from an input set of data elements to reconstruct, by collapsing said sequential reconstruction method to reduce cost, and
wherein said means for reconstructing collapses said sequential reconstruction method by at least one of:
using implicit intermediate results to reconstruct said data element;
determining whether any unnecessary data elements exist in at least one strip of the plurality of lost strips that are not part of said partial strip, and combining at least a portion of steps in said sequential reconstruction method to eliminate reconstruction of said unnecessary data elements;
avoiding unnecessary use of data elements that are not lost;
avoiding duplicate use of data elements that are not lost; and
avoiding multiple use of data elements that are not lost.

12. The system according to claim 11, wherein said means for reconstructing uses said direct reconstruction method to determine at least one initialization point for said sequential reconstruction method.

13. The system according to claim 11, wherein said storage system includes at least one of a parity scheme and an XOR-based RAID scheme.

14. The system according to claim 11, wherein said means for reconstructing determines a most cost effective starting point for said sequential reconstruction method using said direct reconstruction method.

15. A tangible signal-bearing storage medium tangibly embodying a program of machine-readable instructions executable by a digital processing apparatus to perform a method for determining reconstruction formulas for partial strip reconstruction in a storage system, using, selectively, a combination of a direct reconstruction method and a sequential reconstruction method, said method comprising:
determining, using a processor on a computer, a reconstruction cost for executing said reconstruction, respectively, using said direct reconstruction method, using said sequential reconstruction method, and using a combination of said direct reconstruction method and said sequential reconstruction method; and
using a reconstruction formula for said partial strip reconstruction for whichever said reconstruction method is determined to have a lowest reconstruction cost, wherein said sequential reconstruction method reconstructs a data element, from an input set of data elements to reconstruct, by collapsing said sequential reconstruction method to reduce cost, wherein said collapsing said sequential reconstruction method comprises at least one of:

using implicit intermediate results to reconstruct said data element;

determining whether any unnecessary data elements exist in at least one strip of the plurality of lost strips that are not part of said partial strip, and combining at least a portion of steps in said sequential reconstruction method to eliminate reconstruction of said unnecessary data elements;

avoiding unnecessary use of data elements that are not lost;

avoiding duplicate use of data elements that are not lost; and avoiding multiple use of data elements that are not lost.

* * * * *